UNITED STATES PATENT OFFICE 2,269,892

INSECTICIDE AND FUNGICIDE

Roscoe H. Carter, Washington, D. C., assignor to Henry A. Wallace as Secretary of Agriculture of the United States of America, and to his successors in office No Drawing. Application June 20, 1940,
Serial No. 341,495

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to compounds useful as fungicides and insecticides. It also relates to methods of preparing such compounds.

Organic and inorganic sulfur compounds, metal salts of organic compounds and similar materials have been found useful as fungicidal and insecticidal preparations.

An object of this invention is to provide metal salts of an organic sulfur compound prepared from a compound containing carbon, oxygen and nitrogen in a heterocyclic ring.

Di-thiocarbamic acids are the products resulting from the reaction between carbon disulfide and basic amines which contain at least one hydrogen attached to the nitrogen. Di-thiocarbamic acids are unstable, and cannot be separated as such, but can be separated as the metal salts, as for instance sodium di-methyl di-thiocarbamate, a well-known article of commerce.

Tetrahydro 1,4,2-oxazine commonly known as morpholine is a basic amine in which the nitrogen is a member of a heterocyclic ring containing also carbon and oxygen.

I have found that when morpholine is treated with carbon disulfide the di-thiocarbamic acid of morpholine is formed. I have further found that when a solution of this di-thiocarbamic acid, or a solution of its salts, are treated with solutions of the heavy metals, as for instance zinc chloride, mercuric chloride, ferric chloride, arsenious chloride, cupric sulfate, etc., the metal salts of the di-thiocarbamic acid of morpholine are precipitated out as insoluble, finely divided powders.

The following examples illustrate methods of carrying out my invention, but are not to be construed as limitations on the method.

Example 1

One hundred grams of morpholine was dissolved in 100 g. of water. Considerable heat was developed. When the solution had cooled, 85 grams plus a slight excess of carbon disulfide was added slowly through a reflux condenser. A reaction was evident and considerable heat was developed. This reaction mixture was then diluted with four to five liters of water and to this solution was added with stirring, a solution of 74 grams of zinc chloride. A white precipitate formed; this was filtered off, washed with water and dried. Analyses of this material for zinc and sulfur gave results agreeing closely with the theoretical value for these elements in the zinc salt of the di-thiocarbamic acid of morpholine.

Example 2

The same procedure was followed as in Example 1 except the use of 44 grams of carbon disulfide and 38 grams of zinc chloride. The resulting precipitate was apparently identical with that obtained in Example 1 and analyses for zinc and sulfur agreed closely with the theoretical values for these elements in the zinc salt of the di-thiocarbamic acid of morpholine.

Example 3

Twenty grams of morpholine was dissolved in 200 g. of water and 17 g. of carbon disulfide were then added slowly with shaking. A white precipitate formed which was filtered off, washed with water and then dried. Ten grams of this material was dissolved in water and to the solution was added a solution of 7.6 grams of copper sulfate. A reddish brown precipitate was formed which was filtered off, washed and dried. This was the cupric salt of the di-thiocarbamic acid of morpholine.

Example 4

The same procedure was followed as in Example 3 except a solution of 8.3 grams of mercuric chloride was used in place of the solution of copper sulfate. A white precipitate was formed.

The compounds produced by these reactions have the empirical formula:

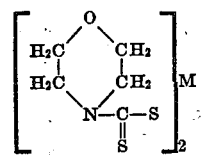

where M is a divalent metal.

Example 5

The same procedure was followed as in Example 3 except a solution of 5.5 grams of ferric chloride was used in place of the solution of copper sulfate. A dark red or purplish precipitate was formed. This compound may be represented by the formula:

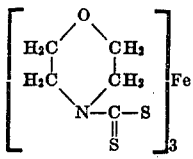

Solutions of other heavy metals, lead, silver, arsenic, were tried resulting in the formation of precipitates, but solutions of the alkaline earth metals, calcium, magnesium, and barium gave no precipitates.

Samples of various metal salts of the di-thiocarbamic acid of morpholine were tested for their fungicidal and insecticidal effects. The copper, iron, mercury and the zinc salt in particular were found to be fungicidal against the organisms causing peach brown rot (*Sclerotinia fructicola*) and apple bitter rot (*Glomerella cingulata*). They were not phytocidal.

The zinc salt when tested in concentrations ranging from 210–230 mmg. per sq. cm against several varieties of insects, as for example, imported cabbage worm, and Hawaiian beet webworm, showed toxicity, and when iron salt in the concentration of 185 mmg. per sq. cm. was tested against these insects, it showed toxicity. When tested by the jar method, iron, and mercury salts of the di-thiocarbamic acid of morpholine in lethal dosage of .666%, a 100% kill was effected against the screw worm.

It is not to be inferred that these materials are toxic only to these organisms as these illustrations are cited only to indicate that they do have toxicity.

Having thus described my invention, what I claim for Letters Patent is:

I claim:

A fungicide and insecticide containing as its essential active ingredient a heavy metal salt of the di-thiocarbamic acid of morpholine.

ROSCOE H. CARTER.